United States Patent [19]

Curtis

[11] Patent Number: 4,696,390

[45] Date of Patent: Sep. 29, 1987

[54] BULK CONVEYOR

[76] Inventor: Marland Curtis, E. 5825 Railroad, Spokane, Wash. 99212

[21] Appl. No.: 822,859

[22] Filed: Jan. 27, 1986

[51] Int. Cl.⁴ ............................................. B65G 15/08
[52] U.S. Cl. .................................................. 198/823
[58] Field of Search ............................... 198/823, 833

[56] References Cited

U.S. PATENT DOCUMENTS

| 826,312 | 7/1906 | Catlin . |
| 1,702,314 | 2/1929 | Rankine et al. . |
| 2,582,881 | 1/1952 | Mitchell . |
| 2,727,617 | 12/1955 | Thomson . |
| 2,821,290 | 1/1958 | Duncan . |
| 2,838,164 | 6/1958 | Duncan . |
| 2,865,494 | 12/1958 | Duncan . |
| 3,381,799 | 5/1968 | Havelka . |
| 4,351,431 | 9/1982 | Fenton, Jr. et al. . |
| 4,378,875 | 4/1983 | Allan et al. . |

FOREIGN PATENT DOCUMENTS

| 470298 | 1/1929 | Fed. Rep. of Germany ...... 198/823 |
| 502402 | 3/1939 | United Kingdom . |
| 796094 | 1/1981 | U.S.S.R. .............................. 198/823 |

Primary Examiner—Andres Kashnikow
Attorney, Agent, or Firm—Wells, St. John & Roberts

[57] ABSTRACT

A bulk conveyor is described, including an elongated belt with means for supporting the belt along its working flight. The working flight support includes a number of cradle members connected in spaced relation along opposed roller chains. The chains are trained about sprockets between end rolls that mount the conveyor belt. The chains and the sprockets rotatably mounting them to the frame permit simultaneous motion of the cradle support members with the belt along the working flight. They also hold the cradle members in proper transverse orientation to the belt length. The cradles are supported along tracks that bear the weight of the cradles and of the load carried on the working flight. Motion of the cradles along the working flight is simultaneous with the belt so there is little frictional sliding engagement between the contacting surfaces of the belt and cradle. The belt leaves contact with the cradles along its return flight and rides over spaced support rolls below the returning cradles. Wheels on the cradles may be selectively adjusted to maintain proper wheel alignment along the frame-mounted tracks in relation to the planes of the roller chains.

13 Claims, 6 Drawing Figures

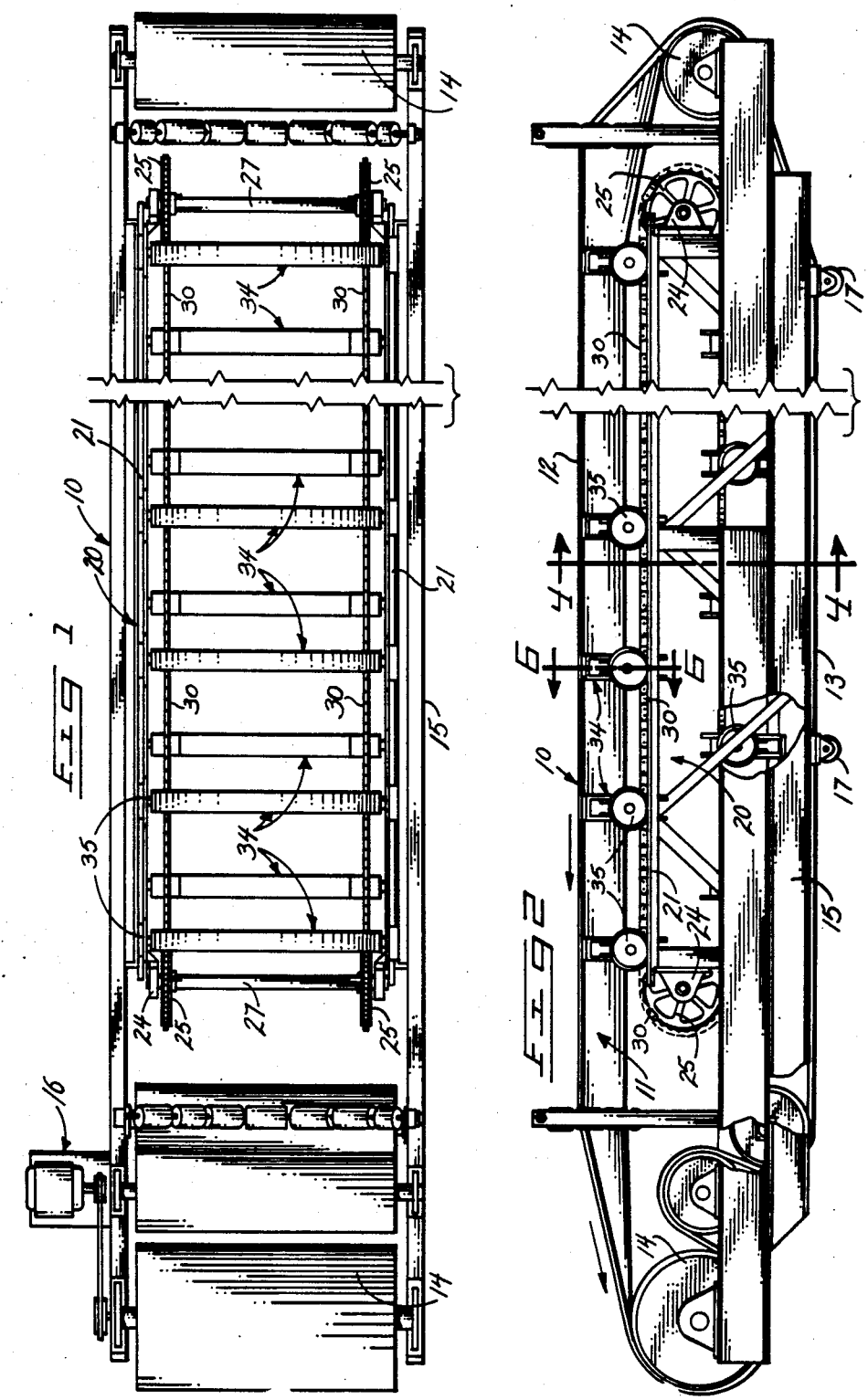

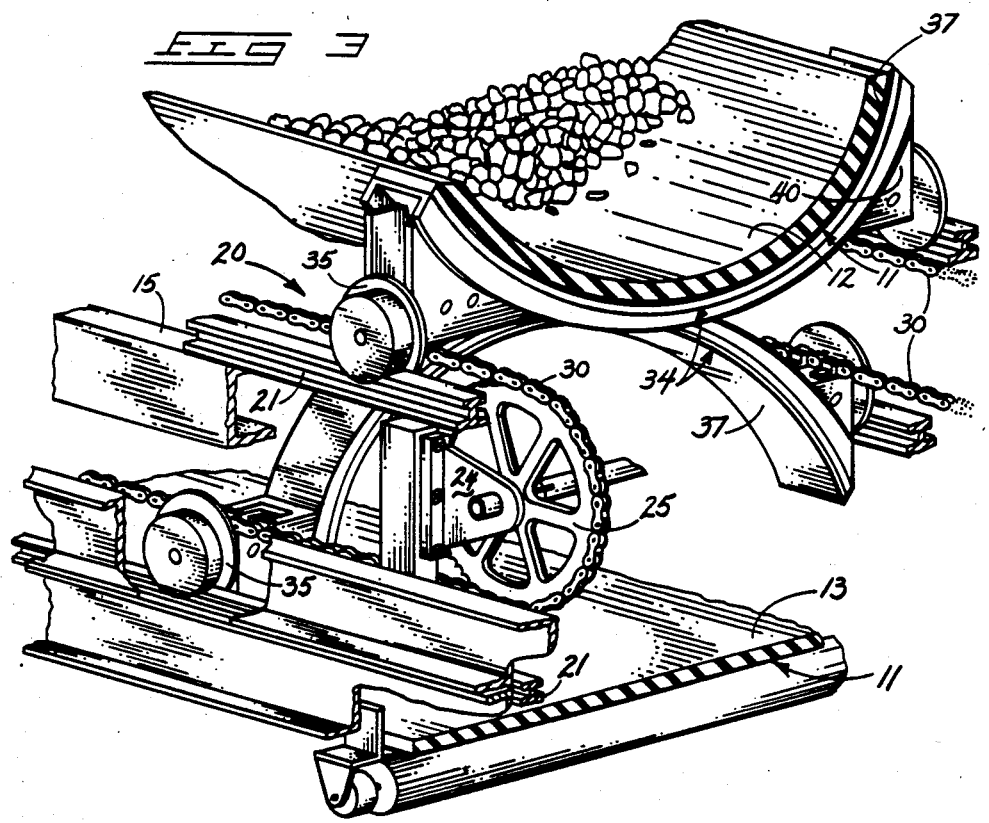
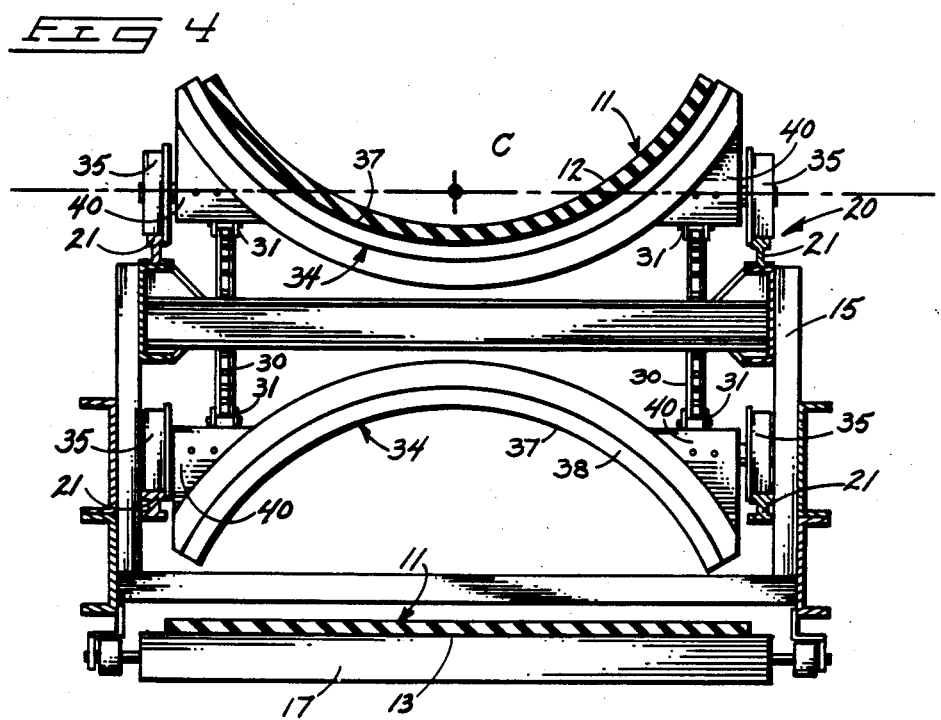

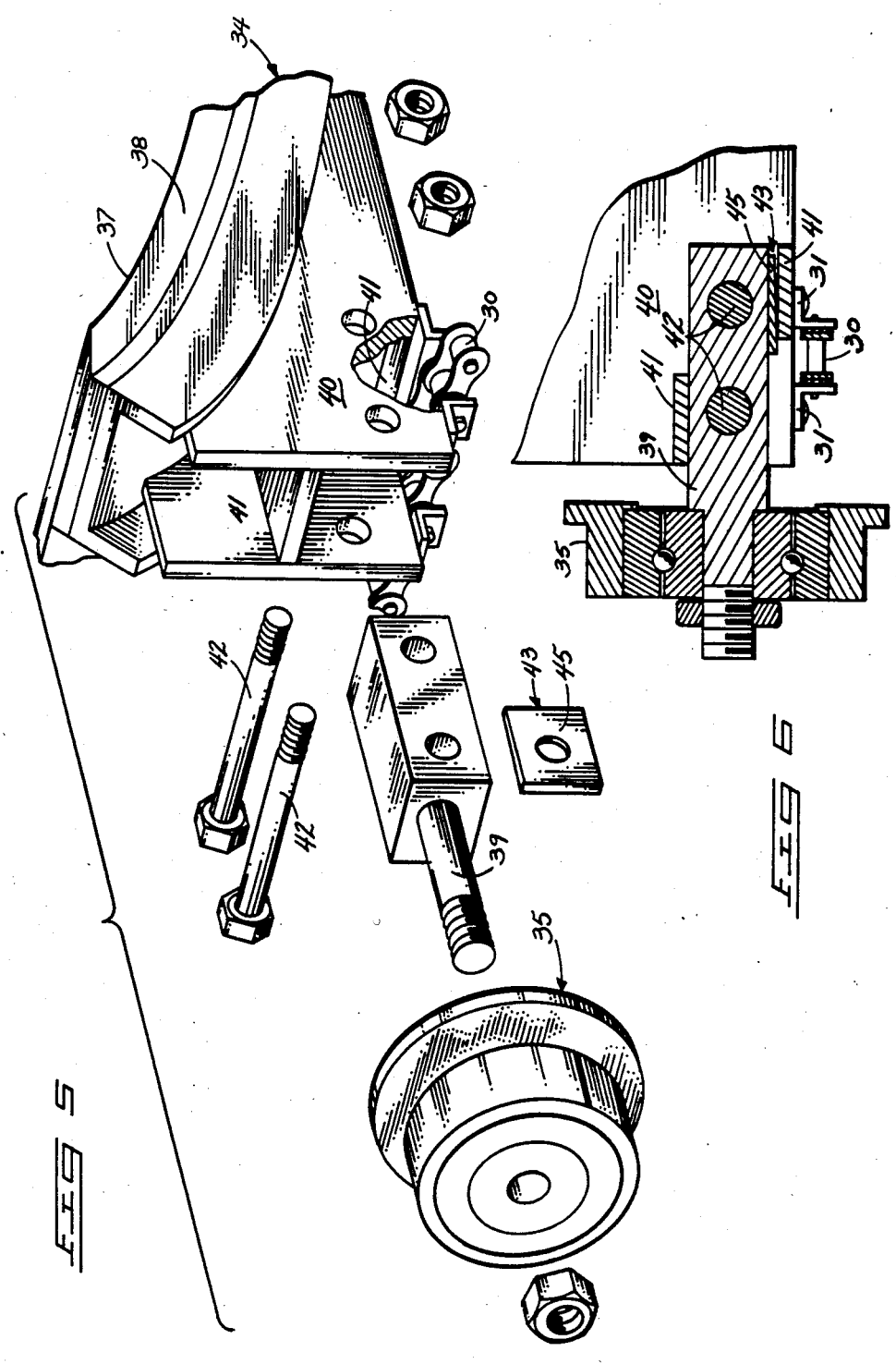

BULK CONVEYOR

FIELD OF THE INVENTION

The present invention relates to conveying of bulk materials via elongated endless belts.

BACKGROUND OF THE INVENTION

Heavy bulk materials such as sand, gravel, rocks, and the like must often be transported in a steady stream for loading vehicles, stockpiling, or transporting the bulk materials for processing. The typical conveyor includes a long, wide, endless belt often formed of fiber reinforced rubber. The flexible belts may be trained over conveyor rolls and driven about working and return flights that extend over substantial lengths.

Belts for bulk material conveyors are very expensive and time consuming to replace. Effort has therefore been directed to minimize wear along the belt surfaces to thereby extend the belt life to its maximum limit.

One approach at reducing belt wear has been to provide movable support beneath the working flight. U.S. Pat. Nos. 2,838,164, 2,865,494, and 2,821,290 to Duncan disclose rigid weight-bearing U-shaped transverse support members for supporting a conveyor belt. The support members are pivotally connected at opposite ends to wheels that ride along tracks. The pivotal connection between the wheels and support members allows the support members to maintain an upwardly facing concave orientation on both return and working flights. The individual support members are interconnected by a "cable chain" that allows motion of the support ends in three dimensions.

U.S. Pat. No. 2,727,617 to Thomson discloses a belt conveyor having an intermediate driving support for the conveyor belt. The intermediate support is comprised of a driven set of "endless cables" consisting of chains that are arranged on opposite sides of the belt. Each of the chains is led about a pair of sprockets, one of which is driven. Cross carriers bridge the two endless chain lengths and interrupt the links such that each chain is comprised of a number of short sections interconnecting the cross carriers. Wheels are mounted at the points of connection between the cross carriers and chain links.

A wheel is provided at each connection point on the Thomson conveyor so there is a total of four wheels rotatably mounted on each of the carriers. The connection arrangement requires that the wheels on each end of the cross carriers be spaced along the chain by a distance equal to the pitch of the chain. Since the wheels are of somewhat large diameter, the resulting requirement for chain pitch is substantial—in fact, the pitch is such that specialized end sprockets must be used.

The Thomson conveyor provides drive for the flexible conveyor belt through the chain connected cross carriages. To facilitate transmission of driving power from the carriers to the belt, both working and return flights are contacted by the carriers for driving purposes. The return flight of the conveyor belt is sandwiched between plates provided on the cross carriers and rollers on the conveyor frame. The belt therefore remains in contact with the cross carriers on the working flight and return flight. The weight of the chain and cross carriers rests against the belt along the return flight since there is no support otherwise provided.

U.S. Pat. No. 4,351,431 to Fenton discloses a heavy duty belt conveyor that makes use of typical wire or cast link chain connected carriers. The carriers extend across and under the working flight of the belt and flex according to the load carried thereby. Like the Thomson conveyor, the Fenton device includes a return flight that sandwiches the conveyor belt between the flexible cross carriers and return flight support rolls.

A somewhat similar arrangement is disclosed in U.S. Pat. No. 3,381,799 to Havelka. Here, however, the flexible conveyor belt is secured to the cross carrying frames and the frames are made up of pivotably connected rigid links.

U.S. Pat. No. 2,582,881 to Mitchell discloses an endless conveyor in which the load carrying capability of the working flight is enhanced by a number of interconnected carts, each having a pair of cradle members mounted thereon. The carts include concave surfaces for carrying the working flight of the conveyor belt. The belt is also carried along its return flight by surfaces on the carts opposite the concave surfaces. A complex end roll mechanism is provided for moving the conveyor belt into position above the carts along the return flight. The interconnected carriages are also linked together by a chain for driving purposes.

U.S. Pat. No. 4,378,875 to Allan, et al, discloses a "sling" form of belted bulk material conveyor in which belt carriers are fixed to the belt and are arranged to pivot between a sling cross configuration on the working flight and a straightened configuration on a return flight.

U.S. Pat. No. 826,312 to Catlin disclosed another form of belt wherein the driving cable for the conveyor is connected directly to the belt for support and drive.

U.S. Pat. No. 1,702,314 to Rankine discloses a belt conveyor and elevator wherein a number of carriages are connected together to form a chain link arrangement interconnected by cable. A complex roller mechanism is also shown for selectively engaging and disengaging wheel supported belt carriers. A roller chain driving mechanism is also provided, connecting the releasable roller units to the cable linked carriages.

Of the above apparatus, none are believed to provide an adequate solution to the problem of reducing belt wear in heavy bulk conveying situations, especially along the working and return flights. Efficiency is lost and maintenance becomes high when the complex carriage mechanisms becomes misaligned with the associated conveyor belts. Significant labor and expense also becomes involved when disassembly is required for replacing worn parts. There remains a need, therefore, for a bulk material conveyor with load supporting mechanisms that will operate effectively and that may be easily maintained to movably support a heavy bulk load along the working flight and become disengaged from the belt along the return flight, thereby reducing frictional contact and consequent belt wear. The invention disclosed herein is directed to a solution of the above problems and to fill the need for such apparatus.

BRIEF DESCRIPTION OF THE DRAWINGS

A preferred form of the present invention is illustrated in the accompanying drawings in which:

FIG. 1 is a broken plan view of the present conveyor shown without the conveyor belt for clarity;

FIG. 2 is a side elevation view of the present conveyor arrangement showing the belt in position thereon;

FIG. 3 is a fragmented pictorial view illustrating the present cradle arrangements along the working and return flight of the present conveyor assembly;

FIG. 4 is an enlarged cross-sectional view taken substantially along line 4—4 in FIG. 2;

FIG. 5 is an exploded fragmentary view illustrating the wheel and axle arrangement; and FIG. 6 is an enlarged sectional view of the wheel assembly, taken substantially along line 6—6 in FIG. 2.

DETAILED DESCRIPTION OF THE PREFERRED EMBODIMENT

In compliance with the constitutional purpose of the Patent Laws "to promote the progress of science and useful arts" (Article 1, Section 8), applicant submits the following disclosure of the invention.

The present invention is provided for the purpose of handling heavy bulk material in an efficient and reliable manner. To this end, special provisions have been made to accommodate the heavy loading along the conveyor and reduction of belt wear and maintenance over previously known conveyors.

The present invention includes a support system for the working flight of its conveyor belt that supports the belt and load carried thereon. It also provides support in a movable manner so the conveyor belt will not rub frictionally over stationary surfaces as it moves along its working flight. The load carrying assembly is specially provided with components that accomplish the load carrying function with a minimal friction and corresponding maintenance.

A specific preferred form of the present invention is illustrated in the drawings and, as shown therein, is generally designated by the reference numeral 10. The conveyor 10 includes an elongated endless belt 11. The belt 11 is trained about an endless course including a top working flight 12 and a lower return flight 13. The flights 12 and 13 are defined between end rolls 14 that are rotatably carried on the general conveyor framework 15.

The belt 11 is driven to move in a circuitous path through the working flight 12 and return flight 13 by an appropriate drive means 16 (FIG. 1). The drawings illustrate drive means 16 as connected to one of the end rolls 14. However, it should be understood other appropriate connection may be made, directly or indirectly, for providing driving power to the belt 11.

A very important aspect of the present invention is provision of a working flight support assembly 20 along the conveyor 10. The assembly 20 is provided along the general conveyor framework 15 between the end rolls 14 for providing movable support to the working flight of the belt 11. This is accomplished to minimize frictional engagement between the belt and support surfaces while the belt moves through its working flight carrying the bulk material. The unloaded, return flight 13 is simply supported by means of a number of idler rolls 17 on the frame 15.

Generally, the support assembly 20 includes a number of spaced cradle arrangements 34 movably carried along the framework such that individual cradles 34 will engage and support a section of the working flight 12 between end rolls 14. The cradles 34 are moved along by the conveyor and therefore remain stationary relative to the engaged undersurface of the belt 11 through the length of contact along the working flight. The several cradles 34 are movably supported along a track assembly 21. Successive cradles are interconnected by roller chain assemblies 30 that transmit motion from one cradle to the next, and that also serves to maintain orientation of the cradles in transverse relation to the working flight 12.

The tracks 21 briefly mentioned above are shown in FIGS. 2 through 4. They basically include two track sets, with a first being situated adjacent the working flight 12, and a second set adjacent the return flight 13. The tracks are elongated and oriented parallel to one another. They are situated on the frame 15 longitudinally between the end rolls 14. They are preferably affixed directly to the frame 15 to support the weight of the various cradles 34 and the load of bulk material along the working flight 12.

The tracks 21 are situated adjacent first and second pairs of chain sprockets 25. The sprockets at each end of the tracks 21 may be provided in pairs, with each pair being keyed to a common sprocket shaft 27. The shafts 27 are journalled in bearings 24 and positioned, as shown in FIG. 1, so the sprockets of one pair will align along the framework with the sprockets of the other.

The aligned sprockets 25, as shown in FIG. 1, receive a pair of endless roller chains 30. The chains extend about aligned sprockets 25 to form working and return flights situated between the respective working and return flights 12, 13 of belt 11.

It is pointed out that the term "roller chains" as used throughout this application should be understood to include forms of drive chain wherein a plurality of links are pivotably interconnected by parallel cross pins or rolls that permit motion of the links only about the axes of the pins. Since the pins are parallel, motion of the chain links relative to one another is limited to a single plane for each chain. The term "roller chain" thus excludes those forms of chains such as "cable chain" or "crane chain" that are comprised of interconnected ring-shaped cast or wire links that permit motion of the links in more than one plane. The importance of planar movement of the roller chains will be emphasized in this specification.

The chains are oriented by the sprockets 25 in such a manner that the "planes" of motion in which the links are allowed to move are parallel to one another and longitudinal with respect to the overall conveyor length. The parallel planes in which the chains move are also preferably held perpendicular to the axes of the end rolls 14 and parallel to the tracks 21.

The lateral distance between the parallel chains 30 is bridged by a number of transverse cradles 34. The cradles 34 are secured adjacent their ends to the chains 30 by a mounting means without interrupting the chain lengths. The mounting means, shown in FIGS. 4 through 6, includes a number of brackets 31 secured to the cradle ends and to the chain links. It is important to note that the brackets 31 do not interrupt the "pitch" of the chain. The links and cradles are therefore free to move about the sprockets 25 without requiring special tooth arrangements on the sprockets. In fact, standard, commercially available sprocket and roller chain may be used with the present conveyor.

The chains 30, sprockets 25, and chain brackets 31 also function as means for connecting each of the cradle members at points along the links of the roller chains so the cradles are held transverse to the belt and stationary relative to the associated connection points. The brackets hold the cradles in longitudinal position along the length of the chains. The interconnected chain links permit motion of the links and attached cradle members only within planes (as described earlier) that are perpendicular to the pivot axes of the various links. The roller chains thus prevent the cradles from becoming angularly oriented relative to the desired transverse relationship to the working flight 12. The rigid interconnection of sprockets 25 to sprocket shafts 27 eliminates the possibility that one chain will move about its endless course relative to the other. The chains and sprockets must (by nature of the chain-sprocket connection and sprocket-shaft connection) rotation in unison. The transverse orientation of the cradles will therefore be maintained.

The cradles 34 are movable mounted to the conveyor by means of wheels 35 situated at opposite ends of each cradle. The wheels 35 freely rotate on bearings and are guided and supported by the tracks 21. FIG. 1 illustrates the orientation of cradles 34, wheels 35, and the upper pair of tracks 36. FIGS. 3 and 4 illustrate the relationship between wheels 35 and the lower set of tracks 36. The arrangement, as shown in FIGS. 3 and 4, is such that the wheels may move along the upper pair of tracks, carrying the working flight of the belt 11. The lower pair of tracks support the wheels and carriages upwardly clear of the belt along the return flight 13. The spaced rolls 17 receive and provide support for the belt along its return flight, so the belt and cradles are not in contact along the return flight. This eliminates wear on the belt and the carriages along the return run.

The cradle members are preferably rigid along their lengths and include concave belt receiving surfaces 37. The surfaces 37 may be provided with resilient pads 38 along their lengths for engagement against the belt 11. The pads extend along the full length of the concave surfaces to present resilient support for the surfaces and to resist frictional movement between the cradles and belt along the working flight 12. The pads will thus hold the cradles stationary relative to the conveyor belt from the point at which they engage the working flight 12 to the point at which they move about one of the sprocket sets 25. It may therefore be understood that there is minimal wear along the underside of belt 11 and the pads of the cradle members since the cradle members, when contacting the belt, are stationary relative to the engaged belt surface. The cradles move simultaneously with the belt, supporting the working flight and the load carried thereon.

It is important to note the relationship of the axis of the wheels and the mass of the cradle. The wheel axis for each cradle passes through or is substantially close to the center of gravity for the associated cradle. This relationship is graphically indicated in FIG. 4 where the wheel axis is shown as a center-line, and the approximate center of gravity is shown at "C". The cradle therefore will not become top heavy and have a tendency to "flip over" or right itself along the wheel axis regardless of the cradle orientation at any point along its endless course about the sprockets 25. This provision eliminates unwanted longitudinal binding or twisting forces on the chains that would otherwise be applied through the chain brackets 31 as the cradles move over the sprockets 25.

Other important features of the present invention are illustrated in FIGS. 5 and 6. These figures illustrate the typical connection between the opposed ends of each cradle and the wheel 35 mounted thereto. Each wheel 35 is mounted to a cradle end by means of a wheel axle 39 and means between the axles and cradles for adjusting the angular relationship of the wheels of the tracks. The adjustment means is provided to eliminate binding along the length of the chain that could otherwise occur if the wheels did not track properly relative to the parallel planes in which the roller chains 30 operate.

The axle members 39 rotatably receive the wheels 35 at outward ends thereof. The inward ends of the axle members may be rectangular in cross-section as shown in FIGS. 5 and 6. The rectangular axle configurations are received by brackets 40 at each end of each cradle. The brackets 40 include spaced cross supports 41 that are used as shown in FIG. 6 for engaging top and bottom surfaces of the axle members. The vertical sides of the brackets are received between upright facing surfaces of the brackets.

Bolt assemblies 42 are provided to secure the axle members in place between the facing surfaces of the brackets and elevationally between the cross supports 41 as shown in FIG. 6. The bolt assemblies may be secured through appropriate aligned holes in the bracket and axle assemblies. These holes may be oversized in the axle assemblies to accommodate angular positioning of the axle and attached wheel by shim means 43.

The shim means 43 may be positionable between the bracket means and wheel axles for selectively positioning each wheel axis relative to the associated cradle. The shim means may be comprised of one or more shim plates 45 positioned between any one of the surfaces of the brackets 40 or cross supports 42 and the adjacent surface of the associated axle members 39, depending on the axle alignment desired. The shims can be used to adjust for toe-in, toe-out, camber, and caster of the wheels. During assembly, the shim means may be used to perfectly align the wheels for movement along the tracks in planes perfectly parallel to the chains 30. Proper alignment will reduce wear of the wheels and chains by preventing a binding action that could otherwise occur. The shims may also be used to reposition the wheels to accommodate for deflection across the cradles caused by heavy loading. Alignment adjustments may be made at any time after manufacture depending upon loading and frequency of use.

The present invention is operated simply by situating the conveyor adjacent a source of bulk material to be conveyed. The working flight of the conveyor may be set angularly, depending on the lift requirements of the material and its angle of repose. The present conveyor has been used effectively at angles from the horizontal to approximately 33°. Again, however, the maximum angle may vary according to the nature of the material being conveyed.

Operation is initiated by activating the drive means 16. In the example given in this description, the drive means 16 operates one of the end rolls 14 to continuously move the belt 11 about its return and working flights. As indicated earlier, however, the drive means could be otherwise connected to transmit driving power to the belt 11. The direction of rotation for the belt may be left-to-right as indicated by the arrows in FIG. 2. The working flight support assembly 20 is situated along the path of the working flight for belt 11 such that the individual cradles will engage and form the belt to the concave cross-sectional configuration of the cradle surfaces 37 as shown in FIG. 3 to receive and retain the bulk material. Frictional contact between the undersurface of the belt 12 and cradle surface pads 38 transmits the motion of the belt to the cradles. The chains 30 transmit this motion simultaneously to the remaining cradles so the entire support assembly will cycle simultaneously with the conveyor belt 11.

The simultaneously moving cradles 34 and belt 11 carry material along the working flight of the conveyor from the input end (right side in FIG. 2) to its discharge (left side in FIG. 2). The weight of bulk material carried along the length of the belt is borne primarily by the cradle assemblies. The load is transmitted through the rigid cradle assemblies through the wheels 35, tracks 21 and, consequently, to the conveyor frame 15. The belt may therefore be used to transport the load without bearing its burden over extended lengths, and so is thereby relieved of excessive wear. The support surfaces on the cradles move precisely with the conveyor, virtually eliminating friction at the critical area of the conveyor belt path along its working flight.

The belt discharges its load at the driven end of the conveyor and subsequently returns to the infeed end along the return flight. The return flight of the belt is carried by the spaced rolls 17 clear of the cradles. The return flight of the cradles 34 is supported upwardly clear of the return flight 13 by the bottom set of tracks 21. No load is carried by the belt along its return flight. The rolls 17 freely rotate to carry the belt with minimal friction as the cradle members return above, driven by the chains 30 and the cradle members contacted above by the loaded working flight.

Operation of the conveyor may be continuous. So long as the drive means remains actuated, the belt and cradles will move simultaneously about their respective courses.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

What is claimed is:

1. A bulk conveyor, comprising:
   an elongated endless belt;
   an elongated frame having opposed ends;
   end rolls on the elongated frame for mounting the endless belt to form an elongated working flight and a return flight;
   drive means for moving the belt through the working flight and return flight;
   a plurality of cradle means, each having an elongated belt receiving surface extending between cradle ends for releasably receiving the belt along the working flight thereof;
   wheel means on each end of each cradle means for free rotation thereon about wheel axes oriented longitudinally with respect to the elongated belt receiving surfaces;
   a first set of rigid track means on the frame extending longitudinally between the end rolls and adjacent the working flight for receiving the wheel means and supporting the cradle means and belt along the working flight between the end rolls;
   a second set of rigid track means on the frame extending longitudinally between the end rolls and adjacent the return flight for receiving the wheel means and supporting the cradle means clear of the return flight between the end rolls;
   means on the frame for receiving and supporting the belt along its return flight clear of the cradle means;
   a first pair of chain sprockets mounted to a first sprocket shaft for common rotation about a first sprocket axis that is transverse to the endless belt and positioned between the first and second sets of tracks;
   a second pair of chain sprockets mounted to a second sprocket shaft for common rotation about a second sprocket axis transverse to the endless belt and positioned between the first and second sets of tracks with each sprocket of said second pair aligned with a sprocket of the first pair;
   a pair of endless roller chains extending between and engaged around aligned sprockets of the first and second sprocket pair; and
   means on each cradle means, separate and spaced from the wheel means and wheel axis for connecting each cradle means to the roller chains at points along the lengths of said roller chains such that the belt receiving surfaces of said cradle means are held transverse to the endless belt and stationary relative to the associated connection points along the chains.

2. The bulk conveyor of claim 1 further comprising:
   a wheel axle for each wheel on each cradle means; and
   means between the wheel axles and cradle means for adjusting the angular relationship of the wheels to the tracks.

3. The bulk conveyor of claim 2 wherein the drive means is connected to one of the end rolls for directly driving the belt to move through its working and return flights.

4. The bulk conveyor of claim 1 wherein the belt receiving surfaces of the cradle means each include a resilient pad extending along the belt receiving surface thereof.

5. The bulk conveyor of claim 1 wherein the pair of endless roller chains are each comprised of an endless length of interconnected links spanning the distance between and extending around aligned sprockets of the first and second sprocket pairs; and
   wherein the means for connecting the cradle means to the roller chains is comprised of a bracket at each end of each cradle means;
   wherein the bracket on one end of each cradle means is secured to a link of one roller chain; and
   wherein the bracket on the end opposite the one end of each cradle means is secured to a link of the remaining roller chain.

6. The bulk conveyor of claim 5 wherein the chain lengths are parallel and situated adjacent opposite ends of the cradle means, and wherein the brackets rigidly secure the cradle means to the roller chains such that the belt receiving surfaces thereof are maintained perpendicular to the chain lengths and to the endless belt.

7. The bulk conveyor of claim 1 further comprising:
   a wheel axle for each wheel on each cradle means;
   bracket means at the cradle means ends for releasably mounting the wheel axles; and
   shim means positionable between the bracket means and wheel axles for selectively positioning the wheel axis relative to the associated cradle means.

8. The bulk conveyor of claim 1 wherein the wheels of each cradle means are coaxial and wherein the coaxial wheel axes of each cradle pass through the approximate center of gravity of the cradle means.

9. A movable working flight support assembly for a bulk conveyor having a driven elongated flexible endless belt formed between rolls on a frame to include an upper working flight and a lower return flight, the movable working flight support assembly comprising:
- a plurality of cradles, each having a belt receiving surface formed thereon;
- track means adapted to be mounted on the frame for directing and supporting the cradles and belt along the working flight, and for guiding and supporting the cradles above and clear of the return flight of said belt;
- a pair of wheels for each cradle;
- axles mounting the wheel pairs to the cradles for rolling engagement with the track means;
- a pair of roller chains interconnecting the cradles adjacent ends thereof, for motion in a circuit including the track means;
- means on each cradle, separate of and spaced from the wheel means and wheel axles for connecting each cradle to the pair of roller chains at points along the lengths of said roller chains such that the belt receiving surfaces are held stationary relative to the associated connection points along the chains; said means being adapted to hold the cradles with the belt receiving surfaces thereof oriented transversely to the working flight of the belt;
- sprocket means mounting the roller chains for simultaneous movement in the circuit such that the cradles are movably maintained between the chains in the transverse orientation.

10. The working flight support assembly of claim 9 wherein the wheels of each cradle are coaxial and wherein the wheel axes pass through the approximate center of gravity of the cradle.

11. The working flight support assembly of claim 9 wherein each cradle includes:
- an elongated cradle frame having the belt receiving surface extending between cradle frame ends;
- a wheel axle bracket at each end of the cradle frame;
- wherein the wheels and axles are mounted by said wheel axis brackets to said cradle frame; and
- means for selectively adjusting the angular relationship of the wheels to the track means.

12. The working flight support assembly of claim 11 wherein the means for selectively adjusting the angular relationship of the wheels to the track means is comprised of:
- shim means mountable between the wheel axle brackets and axles for angularly adjusting the orientation of the individual wheel axles relative to the cradle frame.

13. The working flight support assembly of claim 11 wherein the wheels of each cradle include wheel axes that are coaxial and wherein the coaxial wheel axes of each cradle pass through the approximate center of gravity of the cradle.

* * * * *